April 11, 1950

R. F. STAINBACK 2,503,304

TOWING DYNAMOMETER

Filed Aug. 11, 1947

INVENTOR.
Raymond Franklin Stainback
BY M. C. Hayes
ATTORNEY.

Patented Apr. 11, 1950

2,503,304

UNITED STATES PATENT OFFICE 2,503,304

TOWING DYNAMOMETER

Raymond Franklin Stainback, Chapel Hill, N. C.

Application August 11, 1947, Serial No. 767,899
3 Claims. (Cl. 73—88.5)

(Granted under the act of March 3, 1883, as
amended April 30, 1928; 370 O. G. 757)

This invention relates to improvements in measuring and testing equipment, and more specifically to an improved bar-type tension dynamometer of the type using electric wire resistance strain gages as sensitive elements.

The primary object of the invention is to provide a dynamometer for measuring tensile forces in towlines of ships and static loads applied to ship structures for test purposes.

Another object is to provide a dynamometer which is insensitive to changes in temperature and humidity.

A further object is the provision of a dynamometer of the character described which is rugged, accurate, simple and easy to operate.

A still further object is the provision of an improved dynamometer which indicates remotely of the force-sensitive element of the dynamometer.

Other objects and advantages of the invention will become apparent during the course of the following detailed description, taken in connection with the accompanying drawing, forming a part of this specification, and in which drawing.

Figure 1:
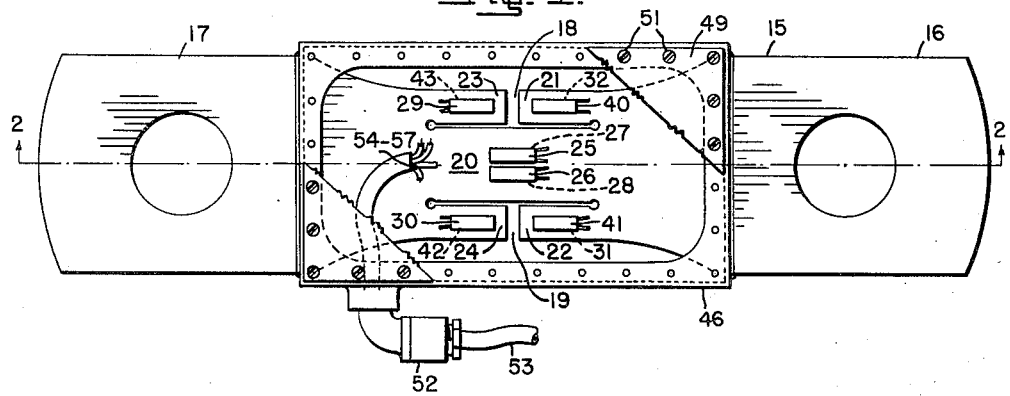
Figure 1 is a top plan view of the dynamometer bar and watertight shield, a portion of the shield being broken away to show the strain gage arrangement.
Figure 2:
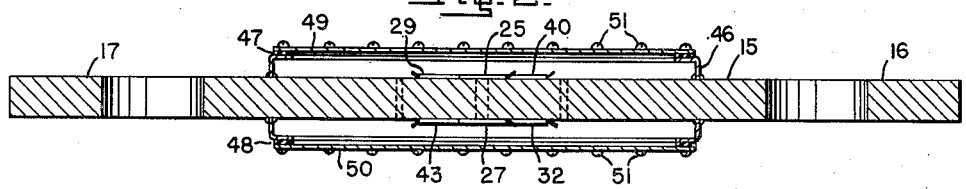
Figure 2 is a central vertical longitudinal sectional view of the dynamometer substantially on the line 2—2 of Figure 1.

In the drawing, which for the purpose of illustration shows only a preferred embodiment of the invention, and wherein similar reference characters denote corresponding parts throughout the views, the numeral 15 designates a machined flat bar with apertured end portions 16, 17 for attachment to standard towline fittings. Between its end portions 16, 17, the bar is provided in its side margins with opposite T-shaped slots 18, 19 forming a reduced intermediate portion 20 and four stub portions 21—24 projecting from the opposite end portions of the bar and extending in closely spaced relation along opposite sides of the reduced intermediate portion 20. The stub portions 21—24 are isolated from strain produced in the reduced portion 20 by tensile loading of the bar but nevertheless are so near the loaded portion that they are subjected to substantially identical temperature changes.

Cemented on the reduced intermediate portion 20 are four electric wire resistance strain gages 25—28 arranged in pairs at opposite sides of the bar and in side-by-side relation symmetrically of its longitudinal axis. The gages 25—28 may be of the type shown and described in the Simmons Patent 2,292,549.

Preferably the bar 15 is made of steel having a high yield strength and the cross-sectional area of the reduced intermediate portion 20 is selected to permit strains of approximately 2500 microinches per inch. The sensitivity of the dynamometer is a function of the modulus of elasticity of the material employed and the area of cross section of the reduced intermediate portion 20. Sufficient sensitivity for load ranges of 0 to 100 kips and 0 to 200 kips can be obtained by using steel whose yield strength is approximately 105,000 pounds per square inch, the cross-sectional area of the reduced section alone being varied to achieve the selected strains. From tests of prior instruments making use of wire resistance gages, it was determined that 2500 microinches per inch is the optimum value of strain.

Inasmuch as changes in temperature of the strain wire and changes in length of the gage support due to temperature variations alter the resistance of the strain gages, temperature effects must ordinarily be considered in the design of the instrument. Four strain gages 40—43 are cemented on the stub portions 21—24 and connected in series-parallel arrangement in one arm 44 of the bridge circuit 34 shown in Figure 3. By connecting the four active gages 25—28 in series-parallel arrangement in an arm 35 of the bridge adjacent arm 44, changes in resistance of the active gages 25—28 and the temperature-compensating gages 40—43 due to temperature effects are electrically cancelled. Two additional arms 36, 37, a battery 38, and galvanometer 39 complete the bridge. It will of course be understood that the arms 44, 35 of the dynamometer may be connected into any suitable bridge circuit and the bridge unbalance may be indicated or recorded by any suitable device or by a null method.

Since the dynamometer may be under load for long periods of time, a check of the no-load readings to determine whether any portion of the gage output is due to zero-shift or uncompensated temperature effects may be necessary. Cemented on the stub portions 21—24 is another set of four gages 29—32 in series-parallel arrangement constituting an auxiliary arm 33 which may be connected into the bridge, as by a switch 45, so as to replace arm 33 comprising the active gages 25—28. Any shift in reading of the indicator 39 when the zero gages 29—32 are switched into the bridge circuit is assumed to denote the occurrence of a corresponding shift in the active gages requiring suitable correction of the data.

Figure 3:
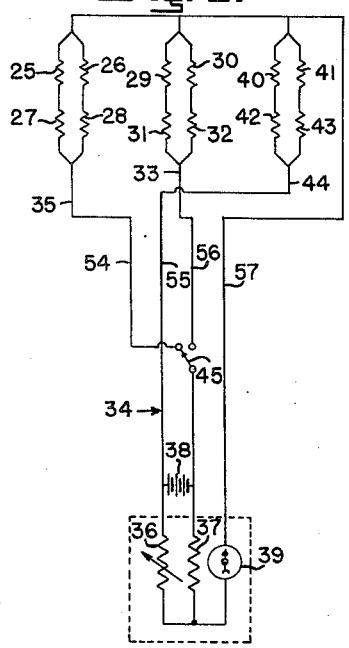
Figure 3 is a diagrammatic view of a Wheatstone bridge measuring and testing circuit that may be used with the dynamometer.

The dynamometer bar 15 is provided with a box-like housing or shield 46 for mechanical protection of the gages. This shield is made watertight, as by providing soft rubber gaskets 47, 48 on which cover plates 49, 50 are removably held in sealing relation as by cap-screws 51. The individual strain gages may be coated with a suitable waterproofing composition for additional protection. Extending into the housing or shield 46 through a suitable stuffing box 52 is an electrical cable 53 including four wires 54—57 for connection to the gages as shown in Figure 3.

The dynamometer may be calibrated by using a suitable structural strength testing machine to apply known axial loads to the bar while the strains are read on the bridge indicator 39. The relationship of applied load to the measured strains is linear with deviations of less than one per cent at all load values. The sensitivity factor used to determine applied load from the measurement of strain output is expressed in microinches per inch per 1000 pounds load. Before calibration the dynamometer is loaded several times to 110 per cent of its rated load to improve linearity of output and reduce zero creep on subsequent loading.

Figure 4:
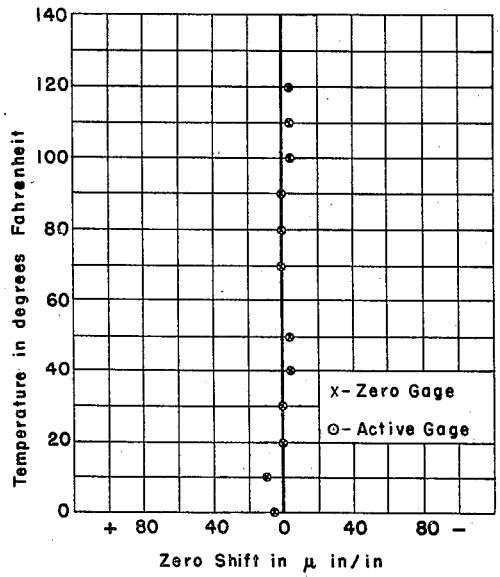
Figure 4 is a graph showing the relationship of dynamometer temperature to zero shift of the indicator.

To determine the effectiveness of temperature compensation, the dynamometers are subjected to extremes of temperature from 0 to 140 degrees Fahrenheit. Heat may also be applied to one end of the bar while the other end is cooled to investigate the effects of such uneven distribution of temperature. As shown in Figure 4, zero shift with maximum temperature variation may be as little as 15 microinches per inch. The change in sensitivity at different temperatures is negligible.

In the use of the dynamometer for measurement of static loads, the dynamometer is connected to a suitable indicator, such as the galvanometer 39. With transient or pulsating loads where the relationship between load and time is required, the dynamometer may be used with a suitable dynamic bridge, amplifier and recording system (not shown).

Various changes may be made in the form of invention herein shown and described without departing from the spirit of the invention or the scope of the following claims.

The invention described herein may be manufactured and used by or for the Government of the United States of America for governmental purposes without the payment of any royalties thereon or therefor.

I claim:

1. A dynamometer comprising an elongate flat bar including opposite end portions and an intermediate portion of reduced width adapted to be strained by a load transmitted longitudinally of the bar, four stub portions projecting from opposite end portions of the bar and extending in closely spaced relation to the intermediate portion at opposite edges thereof whereby said stub portions are not strained by said load and whereby said intermediate portion and said stub portions are similarly affected by temperature changes, and an electrical bridge circuit for measuring said load including two pairs of electric resistance strain gages connected in one arm of the bridge circuit, said pairs being mounted on opposite sides of said intermediate portion so as to respond to changes in strain due to longitudinal loading of the bar and to changes in temperature therein, and two pairs of electric resistance strain gages connected in an arm of the bridge circuit adjacent the first-mentioned arm and mounted each pair on a different side of the bar and each gage on a different stub portion so as to substantially compensate for temperature changes affecting said first-mentioned pairs of gages.

2. A dynamometer comprising a flat bar having two oppositely disposed T-shaped slots one in each side margin of the flat bar providing an intermediate portion of reduced width adapted to be strained by a load transmitted longitudinally of the bar and four stub portions not subject to strain by said load, said intermediate portion and said stub portions being substantially similarly affected by temperature changes, an electric resistance bridge for measuring said load including electric resistance strain gage means connected in one arm of the bridge and mounted on said intermediate portion and at least four electric resistance strain gages connected in an arm of the bridge adjacent the first-mentioned arm and mounted at least one gage on each of said stub portions to substantially compensate for temperature changes affecting said first-mentioned gage means.

3. A dynamometer comprising a flat bar having an intermediate portion of reduced width adapted to be strained longitudinally of the bar, a plurality of stub projections parallel to and adjacent said intermediate section and not subject to stress by said load, electric resistance strain gauge means mounted on said intermediate portion of said bar, first and second electric resistance strain gauge means mounted on each of said parallel stub projections, an electric resistance bridge having said first electric resistance strain gauge means on each of said stub projections in one arm thereof, and switch means for selectively inserting said second electric resistance strain gauge means in an arm of said bridge adjacent said first mentioned arm for calibration of said dynamometer and inserting said electric resistance strain gauge means mounted on said intermediate portion for indicating the strain on said bar, whereby the indication of said dynamometer is rendered substantially free from temperature effects.

RAYMOND FRANKLIN STAINBACK.

REFERENCES CITED

The following references are of record in the file of this patent:

UNITED STATES PATENTS

| Number | Name | Date |
|---|---|---|
| 1,460,530 | Brown et al. | July 3, 1923 |
| 1,894,104 | Kuhlman | Jan. 10, 1933 |
| 2,344,642 | Ruge | Mar. 21, 1944 |
| 2,414,161 | Moore | Jan. 14, 1947 |
| 2,440,706 | Tint | May 4, 1948 |